United States Patent [19]
Ueda et al.

[11] Patent Number: 5,637,393
[45] Date of Patent: Jun. 10, 1997

[54] MAGNETIC RECORDING MEDIUM AND ITS MANUFACTURING METHOD

[75] Inventors: Hideyuki Ueda, Makita-cho; Kenji Kuwahara, Ikoma; Hiroshi Seki, Katano; Kiyoshi Takahashi, Ibaraki; Masaru Odagiri, Kawanishi; Mikio Murai, Higashimachi; Yukikazu Ohchi, Kadoma, all of Japan

[73] Assignee: Matsuhita Electric Industrial Co., Ltd., Okaka, Japan

[21] Appl. No.: 95,008

[22] Filed: Jul. 23, 1993

[30] Foreign Application Priority Data

Jul. 24, 1992 [JP] Japan ................................. 4-198588
Apr. 13, 1993 [JP] Japan ................................. 5-085920
Apr. 19, 1993 [JP] Japan ................................. 5-091014

[51] Int. Cl.$^6$ ................................. G11B 5/66; B32B 5/16
[52] U.S. Cl. .................. 428/332; 428/336; 428/408; 428/694 T; 428/694 TP; 428/94 TC; 428/694 TF; 428/695; 428/900
[58] Field of Search ................................. 428/336, 332, 428/408, 635, 900, 928, 694 T, 694 TP, 694 TC, 694 TR, 694 TF

[56] References Cited

U.S. PATENT DOCUMENTS 4,889,767  12/1989  Yokoyama et al. ................. 428/336

FOREIGN PATENT DOCUMENTS

| 0538855 | 4/1993 | European Pat. Off. . |
|---|---|---|
| 62-58416 | 3/1987 | Japan . |
| 63-251920 | 10/1988 | Japan . |
| 1-184722 | 7/1989 | Japan . |
| 2-126417 | 5/1990 | Japan . |
| 2-126418 | 5/1990 | Japan . |
| 4102225 | 4/1992 | Japan . |
| 4-143623 | 5/1992 | Japan . |

Primary Examiner—Leszek Killman, PHD
Attorney, Agent, or Firm—McDermott, Will & Emery

[57] ABSTRACT

A magnetic recording medium comprising a non-magnetic substrate, a ferromagnetic thin film on the non-magnetic substrate, a hard carbon film on the ferromagnetic thin film, a modified layer of which atomic ratio of nitrogen/carbon is 0.8% or more, and of which thickness is less than 3 nm on the hard carbon film, and a lubricant layer on the modified layer, has excellent electromagnetic conversion characteristic, running stability, durability, and weatherability.

12 Claims, 4 Drawing Sheets

MAGNETIC RECORDING MEDIUM AND ITS MANUFACTURING METHOD

FIELD OF THE INVENTION

The present invention relates to a magnetic recording medium possessing a ferromagnetic thin film to be used in VTR, magnetic disk apparatus, or the like, and more particularly to a magnetic recording medium of ferromagnetic thin film type excellent in electromagnetic conversion characteristic, running stability, running durability, and weatherability.

BACKGROUND OF THE INVENTION

Recently, the VTR is becoming higher in picture quality and higher in sound quality, and the magnetic disk apparatus has come to be higher in capacity and faster in speed. Accordingly, the magnetic recording medium is demanded to be higher in recording density. As the magnetic recording medium to meet this demand, a magnetic recording medium of ferromagnetic thin film type is known, and it is intensively developed and realized. The prior arts of the magnetic recording medium of this type include the Japanese Patent Laid-Open No. 62-58416 (prior art 1), No. 1-184722 (prior art 2), No. 2-125417 (prior art 3), No. 2-126418 (prior art 4), and No. 4-134623 (prior art 5).

Prior art 1 relates to a magnetic recording medium having a protective layer of organic high molecular compound with the ratio of nitrogen (N)/carbon (C) of 40 atomic % or more, provided on a ferromagnetic thin film. Prior art 2 relates to a magnetic recording medium having a hard carbon thin film containing boron (B), titanium (Ti) or silicon (Si), provided on a ferromagnetic thin film. Prior art 3 relates to a magnetic recording medium having a hard carbon film provided on a ferromagnetic thin film, having a plasma polymerization film involving nitrogen provided on the hard carbon film, and having a lubricant layer containing fluorinated carboxylic acid provided on the polymerization film containing nitrogen. Prior art 4 relates to a magnetic recording medium having a hard carbon film provided on a ferromagnetic thin film, treating the hard carbon film surface by glow discharge in the presence of ammonia gas, and having a lubricant layer containing fluorinated carboxylic acid provided on the hard carbon film. The carbon protective film provided on the ferromagnetic thin film of prior art 5 has the relative intensity of Raman bands (1400 $cm^{-1}$ band/1550 $cm^{-1}$ band) of 2.6 to 3.8.

However, even in these prior arts, a further improvement was necessary in order to obtain a magnetic recording medium excellent in electromagnetic conversion characteristic, running stability, running durability, and weatherability.

For example, in the constitution of prior art 1 in which the protective layer of organic high molecular compound with the ratio of N/C of 40 atomic % or more is provided on the ferromagnetic thin film, the hardness of the protective layer of organic high molecular compound itself (film thickness:15 nm) is lowered and is easily worn, and hence running stability and running durability cannot be satisfied sufficiently. In the constitution of prior art 2 in which the lubricant layer is provided on the hard carbon thin film containing B, Ti and Si, although the adhesion strength between hard carbon thin film and lubricant layer is improved, the hardness of the hard carbon thin film itself (film thickness:8 nm) is lowered, and hence the durability of still characteristics or the like is worsened. In the constitution of prior art 3 in which the plasma polymerization film containing nitrogen (film thickness:3 nm) is provided between hard carbon film and lubricant layer, but the plasma polymerization film containing nitrogen is too thick, low in hardness and easily worn, and hence the running stability and running durability cannot be satisfied sufficiently. In the constitution of prior art 4 in which the lubricant layer is provided after treating the hard carbon film surface by glow discharge in the presence of ammonia gas, since the surface of the hard carbon film is heavily damaged by the impact of charged particles generated from ammonia, durability, and weatherability are lowered. In prior art 5, in order to obtain the optimum hardness, toughness and coefficient of kinematic friction of the carbon protective film (film thickness:15 nm), the relative intensity of Raman bands (1400 $cm^{-1}$ band/1550 $cm^{-1}$ band) is defined in a range of 2.6 to 3.8, but weatherability is not sufficient.

SUMMARY OF THE INVENTION

A magnetic recording medium excellent in electromagnetic conversion characteristic, running stability, running durability, and weatherability is obtained by forming a ferromagnetic thin film on a non-magnetic substrate, forming a hard carbon film on the ferromagnetic thin film, exposing the surface of the hard carbon film to glow discharge plasma by a gaseous mixture of nitrogen involving an organic gas and an inorganic gas, or a gaseous mixture of nitrogen involving an organic gas, a hydrocarbon gas and an inorganic gas to form a modified layer which has atomic ratio of nitrogen/carbon of 0.8% or more and which has thickness of less than 3 nm, and forming a lubricant layer on the modified layer.

DETAILED DESCRIPTION OF THE INVENTION

EXAMPLE 1

The thin film magnetic tape (hereinafter called magnetic tape) of the first embodiment of the invention and its manufacturing method are explained below while referring to FIG. 1 and FIG. 2.

EXAMPLE 1-1

Figure 1:
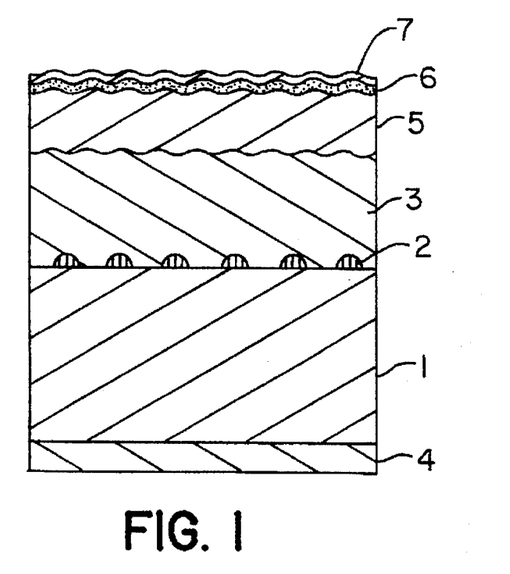
FIG. 1 is a sectional view of a thin film magnetic tape in first, second and fourth embodiments of the invention.

FIG. 1 is a sectional view of the magnetic tape of the embodiment.

In the diagram, numeral 1 is a non-magnetic substrate of polyethylene terephthalate (PET) of 10 µm in film thickness, of which one surface is uneven and provided with bumps 2

(also called protrusions 2) of 30 μm in height and 200 nm in diameter as analyzed by scanning tunnel microscope (STM), by $10^5$ to $10^9$ pieces per 1 $mm^2$. These protrusions 2 are intended to decrease the friction against the magnetic head by controlling the surface roughness of the magnetic tape surface. Numeral 3 is a ferromagnetic thin film of Co(80)-Ni(20) of 180 nm in film thickness, disposed while feeding oxygen by oblique vacuum deposition process. Numeral 4 is a back coat layer of 500 nm in film thickness, which is obtained by applying and drying a methylethylketone/ toluene/cyclohexane solution with solid content of 30% composed of polyurethane, nitrocellulose, and carbon black, by wet process coating method (reverse roll coater). Numeral 5 is a hard carbon film with a film thickness of 13.0 nm and Vickers hardness of 2500 $kg/mm^2$ provided by plasma CVD method on the ferromagnetic thin film 3. Numeral 6 is a modified layer comprised of carbon, nitrogen and oxygen. The modified layer of the present invention involves modified surface having a thickness less than monolayer thickness. Numeral 7 is a lubricant layer of fluorinated carboxylic acid, $C_5F_{11}(CH_2)_{10}COOH$, with film thickness of 4 nm provided on the modified layer 6.

Figure 2:
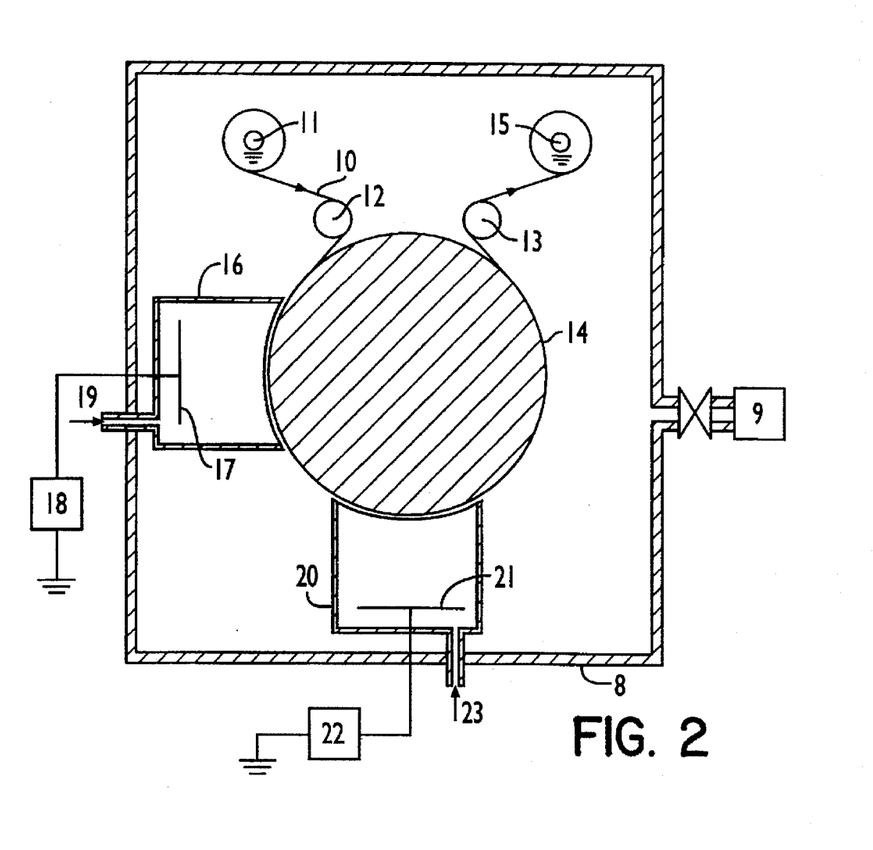
FIG. 2 is a sectional view of an apparatus for explaining the manufacturing method of hard carbon film and modified layer of thin film magnetic tape of the invention.

Referring now to FIG. 2, the manufacturing method of hard carbon film 5 and modified layer 6 of the magnetic tape of the embodiment is described below.

In FIG. 2, numeral 8 is a vacuum chamber, which is evacuated by a vacuum pump 9 until the internal degree of vacuum becomes $10^{-4}$ to $10^{-5}$ torr. Numeral 10 is a 500 mm wide tape, having the ferromagnetic thin film 3 and back coat layer 4 provided on the PET 1, and it is sent out from a unwinder roll 11, and is taken up on a winder roll 15 by way of two pass rolls 12, 13 and a cylindrical cooling can 14. The cooling can 14 is responsible for controlling the rotation so that the tape 10 may be conveyed at a specific speed. Numeral 16 is a discharge tube (CVD plasma generation space) for forming the hard carbon film 5 on the ferromagnetic thin film 3 of the tape 10, and a pipe-shaped discharge electrode 17 is installed in its inside. The pipe-shaped discharge electrode 17 is connected to a plasma generation power source 18. Numeral 19 is a material gas feed port for feeding material gas into the discharge tube 16.

In such apparatus, the hard carbon film 5 of the embodiment was formed in a film thickness of 13 nm, by setting the conveying speed of the tape 10 at 3 to 5 m/min, keeping the total gas pressure at 0.3 torr, feeding the material gas at pressure ratio of 4:1 of hexane ($C_5H_{14}$: hydrocarbon gas) and argon (Ar: inorganic gas) into the discharge tube 16 and applying 1000 V DC to the pipe-shaped discharge electrode 17. Subsequently, from the material gas feed port 23 into the discharge tube 20, pyridine ($C_5H_5N$:nitrogen involving organic gas) and hydrogen ($H_2$: inorganic gas) were fed at pressure ratio of 3:2, keeping the total gas pressure of 0.1 torr, and 1500 V DC was applied to the punching metal discharge electrode 21 installed in the discharge tube 20 to generate a non-equilibrium plasma, and the modified layer 6 of 1.0 nm in thickness was formed on the hard carbon film 5. On the modified layer 5, subsequently, the lubricant layer 7 of fluorinated carboxylic acid, $C_5F_{11}(CH_2)_{10}COOH$, in a film thickness of 4 nm was formed by wet process coating method (reverse rollcoater). Then, the 500 mm wide tape was cut in a width of 8 mm by a slitter, and a magnetic tape for measurement of characteristic was obtained.

EXAMPLE 1-2

What is different from Example 1-1 is that pyridine was replaced by allylamine ($C_3H_7N$:nitrogen involving organic gas).

To clarify the effect of the embodiments, three comparative examples were fabricated.

COMPARATIVE EXAMPLE 1-1

The same composition as Example 1-1 except that pyridine was replaced by benzene ($C_6H_6$:hydrocarbon gas).

COMPARATIVE EXAMPLE 1-2

The same composition as Example 1-1 except that the mixture gas of pyridine and hydrogen was replaced by a mixture gas of pyridine, benzene and oxygen ($O_2$:inorganic gas), at a pressure ratio of 1:5:1.

COMPARATIVE EXAMPLE 1-3

The same composition as Example 1-1 except that the thickness of the modified layer was 6 nm.

COMPARATIVE EXAMPLE 1-4

The same composition as Example 1-1 except that the Vickers hardness of the hard carbon film 5 was 1300 $kg/mm^2$.

The chemical composition of the modified layer 6 was analyzed by the X-ray photoelectron spectroscopy within 4 nm from the surface of the modified layer 6 by using a magnetic tape before forming a lubricant layer 7. Besides, the Vickers hardness of the hard carbon film 5 was obtained in the following method.

First, several specimens formed hard carbon film in the thickness of about 1 to 3 μm on a silicon wafer instead of the tape 10, was fabricated, subseqently, the Vickers hardness of the specimens were measured by using a micro hardness meter. And from the relation between the film thickness and the Vickers hardness, the Vickers hardness of the hard carbon film 5 corresponding to the film thickness of 13 nm was calculated by extrapolation. The film thickness of the hard carbon film was measured by an ellipsometer. The magnetic tapes obtained in the embodiments and comparative examples were measured in the following items.

The results are compiled in Tables 1 and 2.

In Table 2, running durability and weatherability were evaluated in the following method.

(1) Magnetic head clogging, tape damage

Using an 8 mm VTR modified for RF output level measurement, running durability test was conducted by driving the magnetic tape for 300 hours in 300 passes in the environment of 40° C.—80% RH. Before test, video signals are recorded, the RF level output reproduced while running was rectified, and the result was recorded in a pen recorder (model VP-6524A of Matsushita Communication Industrial Co., Ltd.). It was regarded as magnetic head clogging when the RF output level was lowered by 6 dB or more, and the total time was measured. To evaluate the tape damage, the state was visually observed after running durability test, and was judged in five ranks. The ranking was 5 when there was no problem at all practically, and 1 when a practical problem was found.

(2) Change of friction coefficient (μk change)

Before and after the running durability test, the friction coefficient of the magnetic tape was measured. The measuring conditions were as follows.

On a stainless steel (material:15 MH) column of 4 mm in diameter and 0.2 S in surface roughness, the tape was wound with the magnetic surface inside at an embrace angle of 180 degrees, and driven at the input tension of 10 g, 14 mm/sec, and the output tension was measured and the friction coefficient was determined in the following formula.

$\mu = 1/\pi . \ln(\text{output tension: xg/input tension: 10 g})$

The measuring environment was 25° C.—30% RH, and the measurement at the 30th path of running was taken as the friction coefficient.

(3) Rust, peeling

In weatherability test, the magnetic tape was left in the environment of 40° C.—90% RH for 30 days. After weatherability test, the state of the tape specimens was observed by differential interference microscope, and was evaluated in five ranks. The ranking was 5 when no problem was found practically, and 1 when a practical problem was found.

(4) Change of dropout (DO change)

Prior to weatherability test in (3), using an 8 mm VTR modified for dropout measurement, video signals were recorded in magnetic tape, and dropout was measured. After the test, dropout was also measured, and the rate of dropout change before and after the test was expressed in magnification. The dropout was measured by using dropout counter (model VH01CZ of SHIBASOKU) in the conditions of 15 $\mu$s–16 dB.

(5) Environmental gas resistance test ($H_2S$ gas, HCl gas)

The magnetic tape was left in the air containing 1000 ppm of $H_2S$ for 72 hours, and the rusting state was observed by differential interference microscope and evaluated in five ranks. The ranking was 5 when no problem was found practically, and 1 when practical problem was found.

In the magnetic tape of the embodiment, as known from Table 1 and Table 2, since the modified layer 6 with thickness of less than 3 nm containing a specific content of nitrogen atoms having a strong chemical affinity for the polar functional group (carboxyl group) introduced in the lubricant molecules is provided on the hard carbon film 5, the lubricant molecules can be firmly held on the tape surface without lowering the hardness of the protective film composed of hard carbon film and modified layer and without increasing the spacing loss between ferromagnetic thin film and magnetic head, so that running durability and weatherability have been remarkably improved. As the chemical composition of the modified layer 6, the atomic ratio of nitrogen/carbon is required to be 0.8% or more. More preferably, it is effective when the atomic ratio of nitrogen/oxygen is 9.5% or more, and the atomic ratio of the total amount of carbon atoms, nitrogen atoms and oxygen atoms contributed to C—N bond and C—O bond to the total carbon atoms is preferred to be 3.0 atomic % or more, and the atomic ratio of the total amount of nitrogen atoms and oxygen atoms contributed to N—O bond to the total carbon atoms bond is 1.0 atomic % or less. Besides, the Vickers hardness of the hard carbon film 5 is preferred to be 2000 kg/mm$^2$ or more.

EXAMPLE 2

The second embodiment of the invention is described below.

What is different from Example 1 is that the nitrogen concentration of the modified layer 6 is decreased in the direction of the hard carbon film 5 from the surface of the modified layer.

EXAMPLE 2-1

Figure 3:
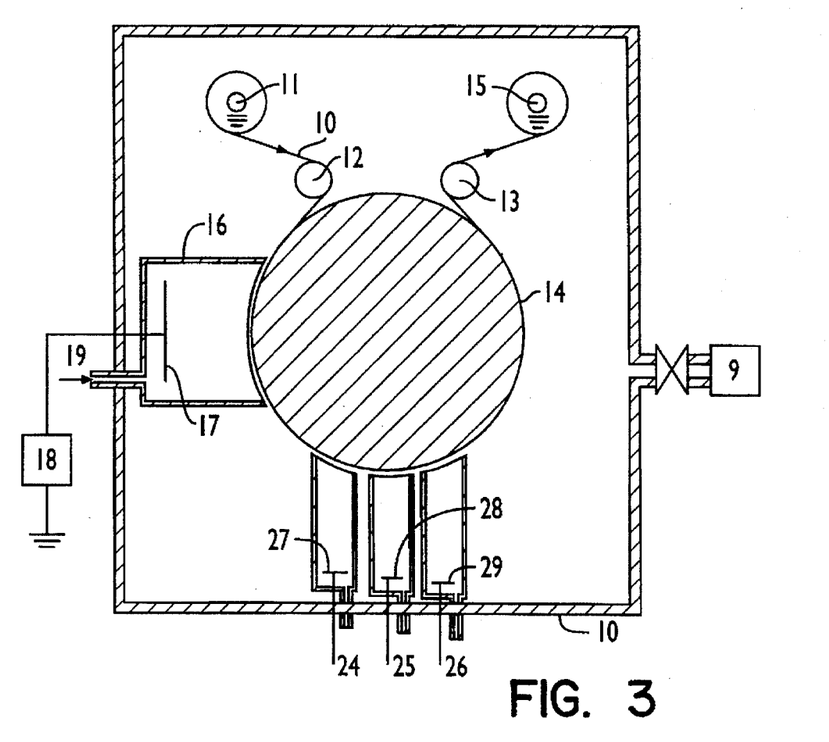
FIG. 3 is a sectional view of an apparatus for explaining the manufacturing method of hard carbon film and modified layer possessing a nitrogen concentration gradient of thin film magnetic tape of the invention.

Referring to FIG. 3, the manufacturing method of the hard carbon film 5 and modified layer 6 of the embodiment is described below.

In FIG. 3, setting the conveying speed of the tape 10 at 3 to 5 m/m keeping the total gas pressure at 0.3 torr, feeding the material gas at pressure ratio of 4:1 of hexane ($C_6H_{14}$:hydrocarbon gas) and argon (Ar:inorganic gas) into the discharge tube 16, and applying 1000 V DC to the pipe-shaped discharge electrode 17, the hard carbon film 5 of 13 nm in thickness was formed by plasma CVD method. The Vickers hardness of the hard carbon film 5 was 2500 kg/mm$^2$. Subsequently, from a material gas feed port 24, a mixture gas of n-propylamine ($C_3H_7NH_2$: nitrogen-involving organic gas):methane ($CH_4$:hydrocarbon gas):hydrogen ($H_2$:inorganic gas) is introduced at 2:7:1, at total gas pressure of 0.1 torr, from a material gas feed port 25, a mixture gas of n-propylamine: methane:hydrogen is introduced at 4.5:4.5:1, at total gas pressure of 0.1 torr, and from a material gas feed port 26, a mixture gas of n-propylamine:methane:hydrogen is introduced at 7:2:1, at total gas pressure of 0.1 torr, respectively. By applying 2000 V DC to punching metal discharge electrodes 27, 28, 29, a non-equilibrium plasma was generated, a modified layer 6 was formed in three steps by 0.6 nm each step, and the modified layer 6 of 1.8 nm in thickness decreasing the concentration of nitrogen in the direction from the surface of the modified layer toward the hard carbon film was formed. At this time, the partial pressure of the nitrogen involving organic gas was 20, 45 and 70% of the total gas pressure. Furthermore, on the modified layer 6, a lubricant layer 7 of fluorinated carboxylic acid, $C_5H_{11}(CH_2)_{10}$COOH, in a film thickness of 4 nm was formed by wet process coating method (reverse roll coater). Then, the 500 mm wide tape was cut to a width of 8 mm by slitter, and the magnetic tape for characteristic measurement was obtained.

To clarify the effects of the embodiment, two examples and three comparative examples were fabricated.

EXAMPLE 2-2

What is different from Example 2-1 is that n-propylamine was replaced by dimethylformamide ($C_3H_7NO$).

EXAMPLE 2-3

What is different from Example 2-1 is that the modified layer was formed in three steps by 0.9 nm each step.

COMPARATIVE EXAMPLE 2-1

The same composition as Example 2-1 except that the lubricant layer 7 was disposed directly on the hard carbon film 5, without forming the modified layer 6 having a concentration gradient of nitrogen.

COMPARATIVE EXAMPLE 2-

The same composition as Example 2-1 except that the mixture gas of n-propylamine, methane and hydrogen was replaced by a mixture gas of n-propylamine, methane and oxygen ($O_2$:inorganic gas), at pressure ratio of 2:7:1, 4.5:4.5:1, 1:7:2.

COMPARATIVE EXAMPLE 2-3

The same composition as Example 2-1 except that the thickness of the modified layer 6 was formed in three steps by 2 nm each step.

COMPARATIVE EXAMPLE 2-4

The same composition as Example 2-1 except that the Vickers hardness of the hard carbon film 5 was 1300 kg/mm$^2$.

The chemical composition of the modified layer 6 of the magnetic tape, and the Vickers hardness and magnetic tape characteristic of the hard carbon film 5 are shown in Tables 3 and 4. The methods of measurement were same as in Example 1.

In the magnetic tape of the embodiment, as known from Table 3 and Table 4, (a) since the modified layer 6 with thickness of less than 3 nm containing a specific content of nitrogen atoms having a strong chemical affinity for the polar functional group (carboxyl group) introduced in the lubricant molecules is provided on the hard carbon film 5, the lubricant molecules can be firmly held on the tape surface without lowering the hardness of the protective film composed of hard carbon film and modified layer and without increasing the spacing loss between ferromagnetic thin film and magnetic head, (b) since the concentration of nitrogen of the modified layer 6 is decreased in the direction from the surface of the modified layer to the hard carbon film, the internal stress of the hard carbon film itself is properly relaxed and the adhesion strength between modified layer and hard carbon film is increased, so that running durability and weatherability have been remarkably improved. As the chemical composition of the modified layer 6, the atomic ratio of nitrogen/carbon is required to be 0.8% or more. More preferably, it is effective when the atomic ratio of nitrogen/oxygen is 9.5% or more, and the atomic ratio of the total amount of carbon atoms, nitrogen atoms and oxygen atoms contributed to C—N bond and C—O bond to the total carbon atoms in the modified layer preferred to be 3.0 atomic % or more, and the atomic ratio of the total amount of nitrogen atoms and oxygen atoms contributed to N—O bond to the total carbon atoms bond to 1.0 atomic % or less. Besides, the Vickers hardness of the hard carbon film is preferred to be 2000 kg/mm$^2$ or more.

EXAMPLE 3

The third embodiment of the invention is described below.

Figure 4:
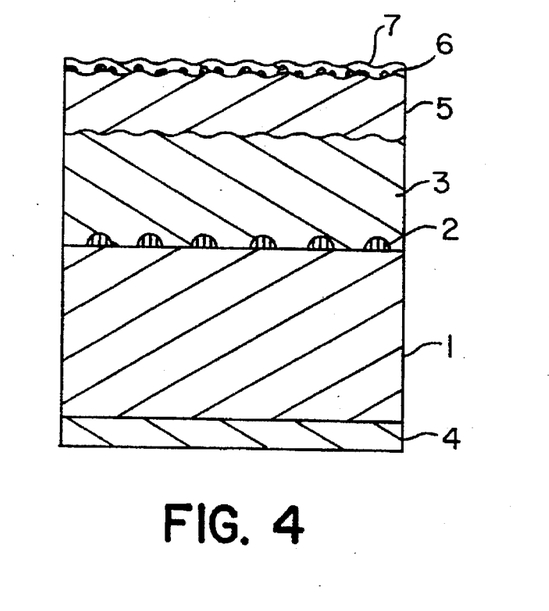
FIG. 4 is a sectional view of a thin film magnetic tape in third embodiment of the invention.

What is different from Example 1 is that the modified layer 6 is island as shown in FIG. 4.

EXAMPLE 3-1

First, using the apparatus shown in FIG. 2, setting the conveying speed of tape 10 at 15 m/rain, keeping the total gas pressure at 0.2 torr, feeding the material gas at the pressure ratio of 4:1 of toluene ($C_7H_8$:hydrocarbon gas) and argon (Ar:inorganic gas) into the discharge tube 16, and applying 1000 V DC to the pipe-shaped discharge electrode 17, the hard carbon film 5 of 10 nm in film thickness was formed. Subsequently, from the material gas feed port 23 into the discharge tube 20, pyridine and hydrogen were fed at pressure ratio of 3:2 keeping the total gas pressure of 0.1 torr, and 1200 V DC was applied to the punching metal electrode 21 installed in the discharge tube 20, and a non-equilibrium plasma was generated to form an island 6 of 2 nm in thickness on the hard carbon film 5. Consequently, on the island layer 6, a lubricant layer 7 of fluorinated carboxylic acid $C_5F_{11}(CH_2)_{10}COOH$ was formed in a film thickness of 4 nm by the wet process coating method (reverse roll coater). Then, a 500 mm wide tape was cut in a width of 8 mm by a slitter, and a magnetic tape for characteristic measurement was obtained. The Vickers hardness of the hard carbon of this example was 2200 kg/mm$^2$.

EXAMPLE 3-2

The same composition as Example 3-1 except that pyridine and hydrogen were replaced by butylamine and $NH_3$.

COMPARATIVE EXAMPLE 3-1

The same composition as Example 3-1 except that the lubricant layer 7 was formed directly on the hard carbon film 5 without forming island 6 on the hard carbon film 5.

COMPARATIVE EXAMPLE 3-2

The same composition as Example 3-1 except that the island 6 was formed in a thickness of 10 nm on the ferromagnetic thin film 3 without forming hard carbon film 5.

COMPARATIVE EXAMPLE 3-3

The same composition as Example 3-1 except that pyridine was replaced by styrene ($C_8H_8$:hydrocarbon gas).

COMPARATIVE EXAMPLE 3-4

The same composition as Example 3-1 except that the thickness of the island 6 was 8 nm.

COMPARATIVE EXAMPLE 3-5

The same composition as Example 3-1 except that the pressure ratio of pyridine and hydrogen was 19:1 and that the total gas pressure was 0.3 tort.

COMPARATIVE EXAMPLE 3-6

The same composition as Example 3-1 except that the surface of the hard carbon film 5 was exposed to glow discharge plasma by pyridine gas only.

COMPARATIVE EXAMPLE 3-7

The same composition as Example 3-1 except that the surface of the hard carbon film 5 was exposed to glow discharge plasma by hydrogen only

COMPARATIVE EXAMPLE 3-8

The same composition as Example 3-1 except that the hard carbon film with Vickers hardness of 1200 kg/mm$^2$ was formed on the ferromagnetic thin film 3 instead of the hard carbon film 5 with Vickers hardness of 2200 kg/mm$^2$.

Incidentally, from the changes of maximum height roughness ($R_{max}$) of the tape 10 before and after forming the island 6 observed by scanning tunnel microscope and the results of two dimensional analysis (surface analysis) by scanning auger microprobe (SAM), it was confirmed that the quantity of islands 6 formed on the hard carbon film 5 in the vicinity of convex part of the embodiment was more than that than in the vicinity of concave part of the surface of the hard carbon film. The Vickers hardness of the hard carbon film 5 in the embodiments and comparative examples, or the Vickers hardness of the plasma polymerization film in Comparative Example 3-8 was obtained in the following method.

First, several specimens formed hard carbon film or plasma polymerization film of about 1 to 3 μm on a silicon wafer instead of tape 10 were fabricated, subseqently, the Vickers hardness of the specimens was measured by using a micro hardness meter. And from the relation between the film thickness and the Vickers hardness, the Vickers hardness of the hard carbon film 5 or plasma polymerization film corresponding to the film thickness of 10 run was calculated by extrapolation. The film thickness of the hard carbon film or plasma polymerization film was measured by an ellipsometer.

In the magnetic tapes obtained by the embodiments and comparative examples, the chemical composition and the characteristic of magnetic tape having the island 6 are shown in Tables 5 and 6. The characteristic of magnetic tapes in Table 6 was measured in the following methods.

(1) Still frame life

Using an 8 mm VTR modified for still frame life measurement, in the environment of 23° C.—10% RH and the condition of 30 g bad, the still picture preliminarily recorded in the magnetic tape was reproduced in the still mode, and the time until the video signal dropped to 6 dB was measured. The measurement was suspended at the maximum duration of 180 minutes.

(2) Magnetic head clogging

Using an 8 mm VTR modified for RF output measurement, in the environment of 40%–80% RH, video signals were recorded in a magnetic tape of about 60 minutes long, and reproduced in 300 passes. In durability test by repeated running, the time lowering the reproduction output by more than 6 dB continuously was accumulated, and the cumulative time was defined as the magnetic head clogging time.

(3) Weatherability test

In the weatherability test, in the environment of 40° C.—90% RH, the magnetic tape was left for about 30 days, and uneven coating, rust, crystal, peeling and other changes were observed by an optical microscope, and were evaluated in five ranks. The ranking was 5 when there was no practical problem, and 1 when practical problem was found.

(4) Friction coefficient μk

On a stainless steel column (SUS420J2) of 4 mm in diameter and 0.2 S in surface roughness, a magnetic tape was wound to contact over 90°, and by setting the input tension at 30 g to the stainless steel column and tape running speed of 0.5 mm/sec, the output tension Xg was measured, and the friction coefficient was determined in the following formula.

μk=2/π 1 nX/30

The measuring environment was 25° C.—30% RH, and the friction coefficient at the 30th pass of running was taken.

As clear from Table 5 and Table 6, in Examples 3-1 and 3-2, since the island 6 of less than 3 nm in thickness with a proper content of nitrogen atoms having a strong chemical affinity for the polar functional group (carboxyl group) introduced in the lubricant molecules is provided on the hard carbon film 5, (a) the hardness of the protective film composed of hard carbon film and island is not lowered, (b) the spacing loss between ferromagnetic thin film and magnetic head is not increased, and (c) the lubricant molecules can be firmly held on the vicinity of the concave part of the tape protrusion substantially contacting with the magnetic head of the VTR rotating at high speed, metal cylinder and fixed post, so that the notable enhancement of still frame life, marked improvement of magnetic head clogging, outstanding enhancement of weatherability, and keeping of running stability can be achieved at the same time.

In Comparative Example 3-1, since the island-shaped modified layer 6 is not provided on the hard carbon film 5, or in Comparative Example 3-3, since nitrogen is not contained in molecules, the adhesion of hard carbon film and fluorinated lubricant layer is not improved, which gave rise to occurrence of magnetic head clogging in the course of a long time. In Comparative Example 3-2, the Vickers hardness of the island shaped is lower than the Vickers hardness of the hard carbon film, and in Comparative Examples 3-4 to 3-6, the sum of nitrogen atoms and oxygen atoms contributed to N—O bond in the island shaped 6 exceeds the appropriate range of the invention, and therefore the island layer is likely to be worn, thereby worsening the tape running stability and shortening the still frame life. In particular, in Comparative Example 3-4, by the chemical affinity of the elements (N, O) contained in the island layer and the polar functional group (carboxyl group) introduced in the lubricant molecules, although the hard carbon film and lubricant layer are firmly adhered with the island layer as intermediate layer, since the island layer is too thick, synergistic effects of the wear resistance of the hard carbon film and low shearing force of the lubricant layer are not exhibited sufficiently, and therefore the running stability of magnetic tape is worse and the still frame life is shortened. Moreover, in Comparative Example 3-6, since only nitrogen involving organic gas is used as the material gas of the island shaped, the hard carbon film surface is not purified, and chemical seeds (reaction active seeds) are deposited, and firm adhesion of the hard carbon film and island layer cannot be maintained, which leads to decrease of still frame life and occurrence of magnetic head clogging in long time. In Comparative Example 3-7, since the hard carbon film surface is heavily damaged by the impact of charged particles generated from $H_2$ which is inorganic gas, extreme decrease of still frame life and worsening of weatherability are caused. In Comparative Example 3-8, since the Vickers hardness of hard carbon film is low, the still frame life is shorter. Hence, the thickness of the island-shaped modified layer 6 should be less than 3 nm, and the chemical composition should have an atomic ratio of 0.8% or more of nitrogen/carbon. More specifically, it is effective when the atomic ratio of nitrogen/oxygen is 9.5% or more, and the sum of carbon, nitrogen and oxygen contributed to carbon-nitrogen bond and carbon-oxygen bond should be 3.0 atomic % or more, and the sum of nitrogen and oxygen contributed to nitrogen-oxygen bond is desired to be 1.0 atomic % or less. The diameter of the island-shaped modified layer 6 is preferably in a range of 1 to 100 nm, or more preferably 10 to 50 nm. In this embodiment, the nitrogen concentration in the island-shaped modified layer 6 is constant, but same effects are obtained if it is decreased in the direction from the surface of the modified layer toward the hard carbon film as in Example 2.

EXAMPLE 4

The fourth embodiment of the invention is described below.

What is different from the magnetic tape in Example 1 is that a modified layer 6 is provided on a hard carbon film 5 possessing a specific property.

EXAMPLE 4-1

The hard carbon film 5 of the embodiment was formed by setting the pressure ratio of methane and argon in a discharge tube 16 at 4:1, total gas pressure at 0.25 torr, and the temperature of a cylindrical cooling can 14 at 15° C., conveying the tape 10 at running speed of 3 to 5 m/min, applying 800 V DC to a pipe-shaped discharge electrode 17, and generating a non-equilibrium plasma. The film thickness was 10 nm. The Vickers hardness of the hard carbon film 5 of the embodiment was 2800 kg/mm$^2$, the density is 2.3 g/cm$^3$, and the relative intensity of Raman bands is 0.94. The density was measured by Rutherford backscattering spectrometry (RBS) method. The relative intensity ratio A/B of Raman bands (herein after called A/B) corresponds, in the Raman spectrum shown in FIG. 5, to the intensity area ratio A/B, where A is the intensity area of Gaussian curve at peak A near 1380 cm$^{-1}$ and B is the intensity area of Gaussian curve at peak B near 1550 cm$^{-1}$. The modified layer 6 was formed in a thickness of 1 nm on the hard carbon film 5, by introducing pyridine and hydrogen from the material gas feed port 23 into the discharge tube 20 at pressure ratio of 3:2 and total gas pressure of 0.1 torr, applying 1500 V DC to the punching metal discharge electrode 21 installed in the discharge tube 20, and generating a non-equilibrium plasma. The other constitution is same as the magnetic tape in Example 1-1.

EXAMPLE 4-2

Same as Example 4-1 except that the pressure ratio of methane and argon is 3:1, total gas pressure is 0.20 torr and applied voltage is 1300 V DC.

COMPARATIVE EXAMPLES 4-1 TO 4-3

Figure 5:
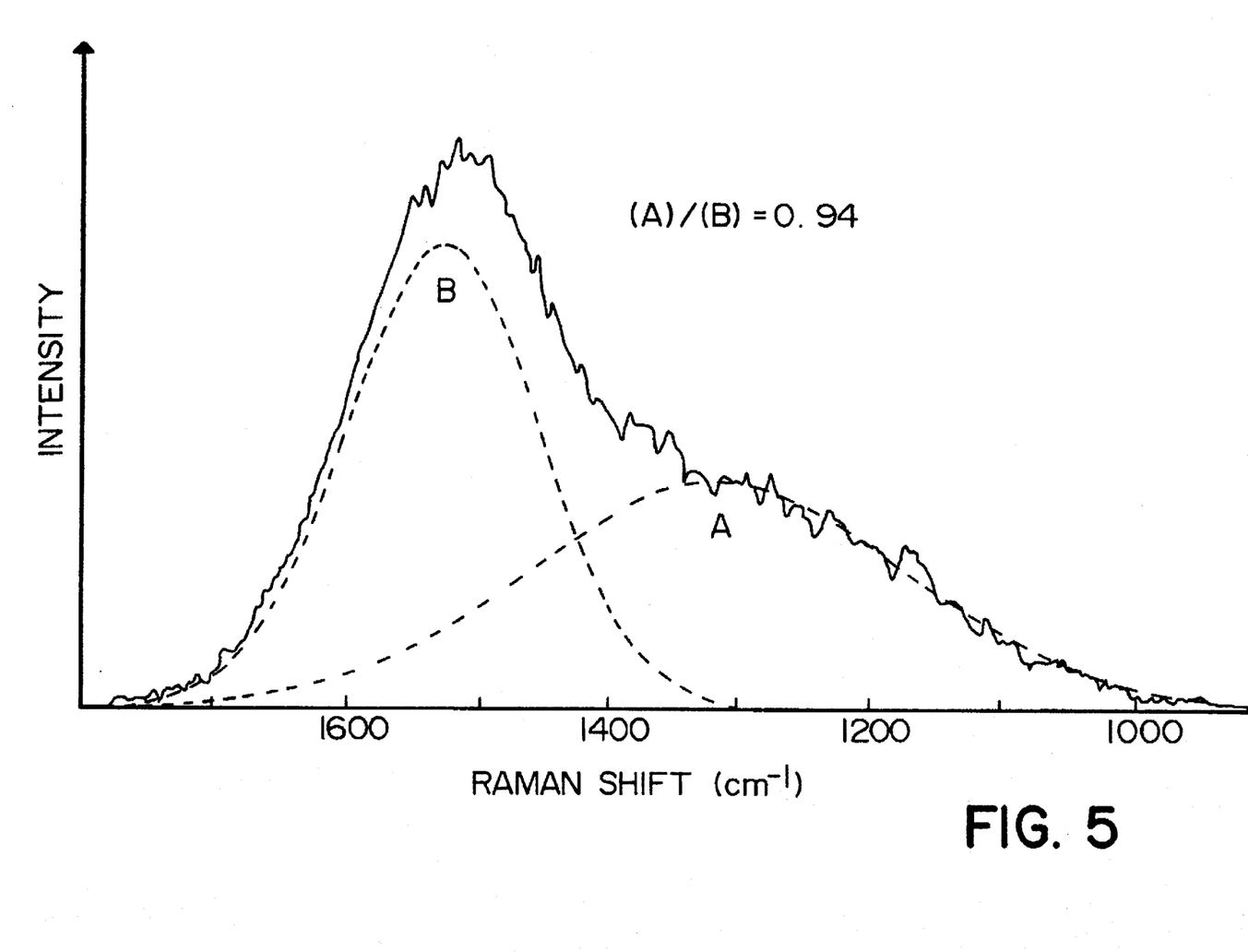
FIG. 5 is a Raman spectral diagram of hard carbon film in Example 4-1 of the invention.

To clarify the effect of the embodiments, three comparative magnetic tapes were prepared by forming hard carbon film 5 differing in A/B, density, and Vickers hardness in the same method as in Example 4-1, except that the pressure ratio of methane and argon, total gas pressure, temperature of cylindrical cooling can, and applied voltage were changed. In Comparative Example 4-3, benzene ($C_6H_6$:hydrocarbon gas) was used instead of pyridine (nitrogen involving organic gas), and the modified layer was formed in the same method as in Example 4-1.

COMPARATIVE EXAMPLE 4-4

The same composition as Example 4-1 except that pyridine was replaced by tetramethyl tin (organic metal compound).

In these magnetic tapes obtained in examples and comparative examples, the chemical composition of modified layer 6, properties of hard carbon film 5, and magnetic tape characteristics are shown in Tables 7 and 8. In Table 8, the still frame life, weatherability, and friction coefficient μk were measured in the same manner as in Example 3. The decrease of output signal in Table 8 was tested by recording video signals in 60-minute long magnetic tape and reproducing by 100 passes in the environment of 23° C.—10% RH. The decrease of output signal was defined by the greatest decrease of output signal in 100-pass reproduction (lowest output value), in comparison with the first pass output (0 dB), expressed in the decibel unit.

As clear from Tables 7 and 8, in Examples 4-1 and 4-2, since the modified layer 6 of less than 3 nm in thickness containing only a specific amount of nitrogen atoms having a strong chemical affinity for the lubricant possessing a polar functional group (carboxyl group) is provided on the hard carbon film 5 having specific properties of A/B, density and Vickers hardness, (a) the spacing loss between the ferromagnetic thin film and magnetic head is not increased, and (b) synergistic effects of wear resistance of hard carbon film and low shearing force of lubricant layer can be exhibited sufficiently, so that outstanding improvement of weatherability and running stability can be achieved at the same time. By contraries, in Comparative Examples 4-1 and 4-3, A/B of the hard carbon film 5 is large (the existence rate of SP$^3$ bond is small) and the Vickers hardness is low, and hence the still frame life is worse. Furthermore, since the density of the hard carbon film 5 is small, moisture invades in the interface of the hard carbon film 5 and ferromagnetic thin film 3, and in the interface of the ferromagnetic thin film 3 and non-magnetic substrate 1, thereby causing peeling. In Comparative Example 4-2, since A/B of the hard carbon film 5 is small (the existence rate of SP$^3$ bond is large), a step (uneven wear) is formed between the amorphous (sendust) part and ferrite part of the sliding surface of magnetic head; thereby increasing the decrease of output signal. In Comparative Example 4-4, by the metal contained in the modified layer 6, metal adhesion occurred on the sliding surface of magnetic head in low humidity environments, and hence the still frame life was extremely decreased and the decrease of output signal was largely worsened. Furthermore, rusting on the surface of magnetic tape and other deterioration of weatherability also occurred. In this embodiment, the nitrogen concentration in the modified layer 6 is constant, but same effects are obtained if it is decreased in the direction from the surface of the modified layer toward the hard carbon film as in Example 2.

EXAMPLE 5

The fifth embodiment of the invention is described below.

Figure 6:
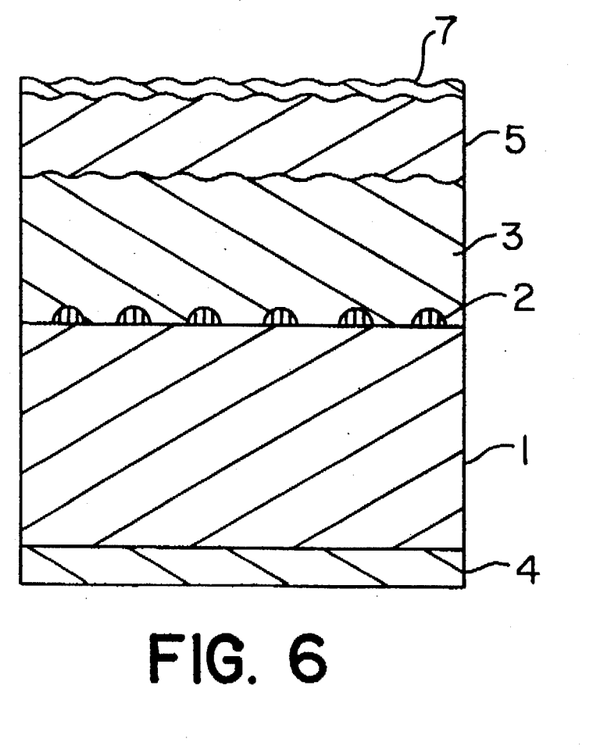
FIG. 6 is a sectional view of a thin film magnetic tape in fifth embodiment of the invention.

What is different from Example 4 is that the modified layer 6 is not formed as shown in FIG. 6.

EXAMPLE 5-1

The hard carbon film 5 in the embodiment was fabricated in the same method as in Example 4-1, and the Vickers hardness was 2800 kg/mm$^2$, the density was 2.3 g/cm$^3$, and A/B was 0.94. Furthermore, a lubricant layer 7 of fluorinated carboxylic acid $C_5F_{11}$ $(CH_2)_{10}$ COOH in a film thickness of 4 nm was directly disposed on the hard carbon film 5 without forming modified layer 6.

To clarify the effect of the embodiment, magnetic tapes were fabricated by forming hard carbon film 5 differing in A/B, density and Vickers hardness, in the same method as in Example 5-1, except that the pressure ratio of methane and argon, total gas pressure, temperature of cylindrical cooling can and applied voltage were changed.

In these magnetic tapes obtained in examples and comparative examples, properties of hard carbon film 5 and magnetic tape characteristics are shown in Table 9. The still frame life, the decrease of output signal and friction coefficient μk were measured.

As clear from Table 9, in Examples 5-1 through 5-4, since density and Vickers hardness of the hard carbon film 5 settled within proper range of the invention, the enhancement of still frame life and improvement of output drop were achieved at the same time. By contraries, in Comparative Examples 5-1 and 5-3, A/B of the hard carbon film 5 is large (the existence rate of SP$^a$ bond is small) and the Vickers hardness is low, and hence the still frame life is worse. Furthermore, since the density of the hard carbon film is small in Comparative Example 5-2, the wear resistance is small, and the still frame life is decreased. In Comparative Example 5-4, since A/B of hard carbon film 5 is small (the existence rate of SP$^3$ bond is large), a step (uneven wear)is formed between amorphous (sendust) part and ferrite part of the sliding surface of magnetic head, thereby increasing the decrease of output signal. Hence, as the hard carbon film of magnetic tape, A/B is desired to be 0.8 to 3.0, the density to be 1.5 g/cm$^3$, and the Vickers hardness to be 2000 kg/mm$^2$ or more.

In the embodiments, only the magnetic tape for 8 mm VTR is explained, but it is not limitative, and the invention may be similarly applied to magnetic tapes for other uses, magnetic disks, and other magnetic recording media. Incidentally, examples of nitrogen involving organic gas used when forming the modified layer include, among others, n-propylamine, dimethylformamide, pyridine, dimethylamine, trimethylamine, triethylamine, isopropylamine, n-butylamine, aniline, and formamide. As inorganic gas, Hi, He, Ar, $N_2$, and $NH_3$ are useful. The partial pressure of the nitrogen involving organic gas when forming the modified layer is desired to be 20 to 90% of the total gas pressure. In the foregoing embodiments, as the polar functional group, only the fluorinated lubricant introducing carboxylic group into molecule is presented, but any fluorinated lubricant containing at least one polar functional group selected from the group consisting of —OH, —SH, —$NH_2$, =NH, —NCO, —$CONH_2$, —CONHR, —$CONR_2$, —COOR, —PR, =PRO, =PRS, —OPO $(OH)_2$, —OPO $(OR)_2$, —$SO_3M$ (where R is a hydrocarbon group with 1 to 22 carbon atoms, M is hydrogen, alkaline metals or alkaline earth metals) may be similarly applied.

In the embodiments, as the non-magnetic substrate, PET was used, but the PET may be replaced by high molecular film such as polyethylene naphthalate, polyamide and polyimide. In the embodiments, the hard carbon film and the modified layer were formed by plasma CVD method, but this forming method is not limitative, and ion beam deposition method, ion beam sputtering method, and laser deposition method may be similarly used. The fluorinated lubricant layer was formed by wet process mating method in the embodiments, but it may be also formed by organic deposition method.

TABLE 1

| Magnetic tape | N/C atomic ratio (%) | N/O atomic ratio (%) | Atomic ratio of C, N, O contributed to C—N bond, C—O bond (atomic %) | Atomic ratio of N, O contributed to N—O bond (atomic %) | Thickness of modified surface (nm) | Vickers hardness of hard carbon film (kg/mm$^2$) |
|---|---|---|---|---|---|---|
| Example 1-1 | 3.4 | 33 | 6.2 | ≦1.0 | 1 | 2500 |
| Example 1-2 | 2.9 | 27 | 4.5 | ≦1.0 | 1 | 2500 |
| Comparative Example 1-1 | — | — | 2.5 | — | 1 | 2500 |
| Comparative Example 1-2 | 0.6 | 8.5 | 2.7 | ≦1.0 | 1 | 2500 |
| Comparative Example 1-3 | 3.1 | 40 | 6.8 | 1.3 | 6 | 2500 |
| Comparative Example 1-4 | 3.4 | 33 | 6.2 | ≦1.0 | 1 | 1300 |

TABLE 2

| | Running durability | | | Weatherability | | | |
|---|---|---|---|---|---|---|---|
| | Magnetic head clogging (sec) | Tape damage | μk change | Corrosion resistance Rust, peel | D.O. (times) | Environmental gas resistance $H_2S$ | HCl |
|---|---|---|---|---|---|---|---|
| Example 1-1 | 0 | 5 | 0.19/0.19 | 5 | 1.1 | 5 | 5 |
| Example 1-2 | 0 | 5 | 0.19/0.20 | 5 | 1.1 | 5 | 5 |
| Comparative Example 1-1 | 13.0 | 2 | 0.27/0.29 | 2 | 3.5 | 3 | 3 |
| Comparative Example 1-2 | 40.0 | 1 | 0.25/0.33 | 1 | 5.8 | 1 | 1 |
| Comparative Example 1-3 | 21.0 | 2 | 0.23/0.31 | 4 | 4.0 | 4 | 4 |
| Comparative Example 1-4 | 6.0 | 3 | 0.20/0.28 | 2 | 4.1 | 3 | 2 |

TABLE 3

| Magnetic tape | N/C atomic ratio (%) | N/O atomic ratio (%) | Atomic ratio of C, N, O contributed to C—N bond, C—O bond (atomic %) | Atomic ratio of N, O contributed to N—O bond (atomic %) | Thickness of modified surface (nm) | Vickers hardness of hard carbon film (kg/mm$^2$) |
|---|---|---|---|---|---|---|
| Example 2-1 | 2.3 | 31.0 | 5.0 | ≦1.0 | 1.8 | 2,500 |
| Example 2-2 | 1.4 | 15.0 | 3.8 | ≦1.0 | 0.45 | 2,500 |
| Example 2-3 | 3.0 | 40.0 | 6.0 | ≦1.0 | 2.7 | 2,500 |
| Comparative Example 2-1 | — | — | — | — | 0 | 2,500 |
| Comparative Example 2-2 | 0.5 | 7.5 | 2.4 | ≦1.0 | 1.8 | 2,500 |
| Comparative Example 2-3 | 2.2 | 40.0 | 7.5 | 1.2 | 6.0 | 2,500 |
| Comparative Example 2-4 | 2.3 | 31.0 | 5.0 | ≦1.0 | 1.8 | 1,300 |

TABLE 4

| | Running durability | | | Weatherability | | | |
| --- | --- | --- | --- | --- | --- | --- | --- |
| | Magnetic head clogging (sec) | Tape damage | μk change | Corrosion resistance | | Environmental gas resistance | |
| | | | | Rust, peel | D.O. (times) | H₂S | HCl |
| Example 2-1 | 0 | 5 | 0.20/0.20 | 5 | 0.9 | 5 | 5 |
| Example 2-2 | 0 | 5 | 0.20/0.20 | 5 | 1.0 | 5 | 5 |
| Example 2-3 | 0 | 5 | 0.21/0.21 | 5 | 1.0 | 5 | 5 |
| Comparative Example 2-1 | 12.0 | 3 | 0.26/0.29 | 2 | 3.3 | 1 | 1 |
| Comparative Example 2-2 | 30.0 | 1 | 0.26/0.32 | 1 | 4.9 | 1 | 1 |
| Comparative Example 2-3 | 25.5 | 1 | 0.21/0.37 | 4 | 6.2 | 4 | 4 |
| Comparative Example 2-4 | 5.5 | 2 | 0.20/0.28 | 3 | 4.1 | 3 | 2 |

TABLE 5

| Magnetic tape | N/C atomic ratio (%) | N/O atomic ratio (%) | Atomic ratio of C, N, O contributed to C—N bond, C—O bond (atomic %) | Atomic ratio of N, O contributed to N—O bond (atomic %) | Thickness of modified surface (nm) | Vickers hardness of hard carbon film (kg/mm²) |
| --- | --- | --- | --- | --- | --- | --- |
| Example 3-1 | 1.8 | 18 | 4.3 | ≦1.0 | 2 | 2200 |
| Example 3-2 | 2.6 | 24 | 5.3 | ≦1.0 | 2 | 2200 |
| Comparative Example 3-1 | — | — | — | — | — | 2200 |
| Comparative Example 3-2 | 2.2 | 21 | 4.7 | ≦1.0 | 10 | — |
| Comparative Example 3-3 | — | — | 2.3 | — | 2 | 2200 |
| Comparative Example 3-4 | 2.9 | 31 | 6.2 | 1.4 | 8 | 2200 |
| Comparative Example 3-5 | 2.4 | 22 | 5.9 | 1.7 | 2 | 2200 |
| Comparative Example 3-6 | 3.2 | 38 | 6.1 | 22.1 | 2 | 2200 |
| Comparative Example 3-7 | — | — | 1.9 | — | — | 2200 |
| Comparative Example 3-8 | 1.8 | 19 | 4.3 | ≦1.0 | 2 | 1200 |

TABLE 6

| | Evaluation result of magnetic type | | | |
| --- | --- | --- | --- | --- |
| Magnetic tape | Still frame life | Magnetic head clogging (sec/300 hr) | Weatherability test (rated in 5 ranks) | Friction coefficient μk |
| Example 3-1 | >180 | 1 | 5 Not occurring | 0.18 |
| Example 3-1 | >180 | 1 | 5 Not occurring | 0.19 |
| Comparative Example 3-1 | 120 | 10 | 2 Crystal | 0.22 |
| Comparative Example 3-2 | 15 | 9 | 5 Not occurring | 0.27 |
| Comparative Example 3-3 | 30 | 18 | 2 Crystal | 0.25 |
| Comparative Example 3-4 | 90 | 5 | 5 Not occurring | 0.23 |
| Comparative Example 3-5 | 25 | 12 | 4 Uneven coating | 0.26 |
| Comparative Example 3-6 | 50 | 47 | 3 Uneven coating | 0.23 |
| Comparative Example 3-7 | 5 | 15 | 1 Rust, crystal | 0.25 |
| Comparative Example 3-8 | 40 | 5 | 5 Not occurring | 0.24 |

TABLE 7

| Magnetic tape | N/C atomic ratio (%) | N/O atomic ratio (%) | Atomic ratio of C, N, O contributed to C—N bond, C—O bond (atomic %) | Atomic ratio of N, O contributed to N—O bond (atomic %) | Thickness of modified layer (nm) | Characteristics of hard carbon film | | |
|---|---|---|---|---|---|---|---|---|
| | | | | | | A/B of Raman spectrum | Density (g/cm$^3$) | Vickers hardness (kg/mm$^2$) |
| Example 4-1 | 3.3 | 31 | 6.1 | ≦1.0 | 1 | 0.94 | 2.3 | 2800 |
| Example 4-2 | 3.1 | 28 | 5.0 | ≦1.0 | 1 | 0.83 | 2.7 | 3200 |
| Comparative Example 4-1 | 3.9 | 41 | 6.7 | ≦1.0 | 1 | 4.67 | 1.0 | 1000 |
| Comparative Example 4-2 | 2.6 | 24 | 4.1 | ≦1.0 | 1 | 0.70 | 2.9 | 4000 |
| Comparative Example 4-3 | — | — | 2.4 | — | 1 | 4.61 | 1.2 | 800 |
| Comparative Example 4-4 | — | — | 2.8 | — | 1 | 0.94 | 2.3 | 2800 |

TABLE 8

| | Magnetic tape characteristic | | | |
|---|---|---|---|---|
| Magnetic tape | Still frame life | Decrease of output signal (dB) | Weatherability | Friction coefficient μk |
| Example 4-1 | >180 | 0 | Not occurring | 0.16 |
| Example 4-2 | >180 | +0.5 | Not occurring | 0.14 |
| Comparative Example 4-1 | 30 | −3.0 | Peeling | 0.27 |
| Comparative Example 4-2 | 60 | −5.5 | Not occurring | 0.18 |
| Comparative Example 4-3 | 15 | −3.5 | Peeling | 0.28 |
| Comparative Example 4-4 | 10 | −8.0 | Rusting | 0.20 |

TABLE 9

| | Characteristic of hard carbon film | | | Magnetic tape characteristic | |
|---|---|---|---|---|---|
| Magnetic tape | A/B of Raman spectrum | Density (g/cm$^3$) | Vickers hardness (kg/mm$^2$) | Still frame life (min) | Decrease of output signal (dB) |
| Example 5-1 | 0.94 | 2.3 | 2800 | 120 | −0.5 |
| Example 5-2 | 0.83 | 2.7 | 3200 | 120 | −1.0 |
| Example 5-3 | 1.24 | 2.1 | 2500 | 120 | 0 |
| Example 5-4 | 2.93 | 1.6 | 2000 | 120 | −0.5 |
| Comparative Example 5-1 | 3.51 | 1.7 | 1000 | 40 | −2.0 |
| Comparative Example 5-2 | 2.88 | 1.0 | 2100 | 50 | −1.5 |
| Comparative Example 5-3 | 4.61 | 1.2 | 800 | 20 | −3.0 |
| Comparative Example 5-4 | 0.71 | 2.9 | 4000 | 120 | −6.0 |

We claim:

1. A magnetic recording medium comprised of:
a non-magnetic substrate;
a ferromagnetic thin film formed on said non-magnetic substrate;
a hard carbon film formed on said ferromagnetic thin film;
a modified layer formed on said hard carbon film, which modifies a surface of said hard carbon film and comprises carbon atoms, nitrogen atoms and oxygen atoms, with an atomic ratio of nitrogen being 0.8% or more, and which has a thickness from 0.4 nm to less than 3 nm; and
a lubricant layer formed on said modified layer.

2. A magnetic recording medium comprised of:
a non-magnetic substrate having protrusions;
a ferromagnetic thin film formed on said non-magnetic substrate;
a hard carbon film possessing an uneven surface corresponding to the protrusions of said non-magnetic substrate formed on said ferromagnetic thin film;
islands formed on said hard carbon film, which are comprised of carbon atoms, nitrogen atoms and oxygen atoms with an atomic ratio of nitrogen/carbon being 0.8% or more, and having a thickness from 0.4 nm to less than 3 nm; and
a lubricant layer formed on said islands.

3. A magnetic recording medium comprised of:
a non-magnetic substrate;
a ferromagnetic thin film formed on said non-magnetic substrate;
a hard carbon film formed on said ferromagnetic thin film, which has a peak A at about 1380 cm$^{-1}$ and a peak B at about 1550 cm$^{-1}$ in the Raman spectrum, a ratio of the integrated intensities of the peak A and the peak B ranging from 0.8 to 3.0, and which has density from 1.5 g/cm$^3$ to 2.7 g/cm$^3$;
a modified layer formed on said hard carbon film, which modifies a surface of said hard carbon film and comprises carbon atoms, nitrogen atoms and oxygen atoms, with an atomic ratio of nitrogen/carbon being 0.8% or more, and which has a thickness from 0.4 nm to less than 3 nm; and a lubricant layer formed on said modified layer.

4. A magnetic recording medium of claim 1 or 3, wherein the atomic ratio of nitrogen/oxygen of the modified layer is 9.5% or more.

5. A magnetic recording medium of claim 1 or 3, wherein an atomic ratio of a total amount of carbon atoms, nitrogen atoms, and oxygen atoms contributed to C—N bond and C—O bond to total carbon atoms in the modified layer is 3.0% or more, and an atomic ratio of a total amount of nitrogen atoms and oxygen atoms contributed to N—O bond to total carbon atoms in the modified layer is more than zero and not more than 1.0%.

6. A magnetic recording medium of claim 1 or 3, wherein the concentration of nitrogen of the modified layer is decreased in the direction from the surface of the modified layer to the hard carbon film.

7. A magnetic recording medium of claim 2, wherein the quantity of islands in the vicinity of convex parts is more than that in the vicinity of concave parts of the hard carbon film.

8. A magnetic recording medium of claim 1, 2, or 3, wherein the Vickers hardness of the hard carbon film is in the range from 2000 kg/mm$^2$ to 3200 kg/mm$^2$.

9. A magnetic recording medium comprised of:

a non-magnetic substrate;

a ferromagnetic thin film on said non-magnetic substrate;

a hard carbon film on the ferromagnetic thin film, which has a peak A at about 1380 cm$^{-1}$ and a peak B at about 1550 cm$^{-1}$ in the Raman spectrum, a ratio of the integrated intensities of the peak A and the peak B ranging from 0.8 to 3.0, which has density from 1.5 g/cm$^3$ to 2.7 g/cm$^3$, and Vickers hardness of 2000 kg/mm$^2$ to 3200 kg/mm$^2$; and a lubricant layer on said hard carbon film.

10. A magnetic recording medium of claim 1, 2, 3 or 9, wherein the lubricant layer is a fluorinated lubricant involving at least one polar functional group selected from the group consisting of —COOH, —OH, —SH, —NH$_2$, =NH, —NCO, —CONH$_2$, —CONHR, —CONR$_2$, —COOR, =PR, =PRO, =PRS, —OPO(OH)$_2$, —OPO(OR)$_2$, —SO$_3$M (where R is a hydrocarbon group with 1 to 22 carbon atoms, M is hydrogen, alkaline metals or alkaline earth metals).

11. A magnetic recording medium of claim 2, wherein an atomic ratio of a total amount of carbon atoms, nitrogen atoms and oxygen atoms contributed to C—N bond and C—O bond to total carbon atoms in the islands is 3.0% or more, and an atomic ratio of a total amount of nitrogen atoms and oxygen atoms contributed to N—O bond to total carbon atoms in the islands is more than zero and not more than 1.0%.

12. A magnetic medium of claim 2, wherein the atomic ratio of nitrogen/oxygen of the modified layer is 9.5% or more.

* * * * *